May 20, 1969     D. G. SHERWOOD ET AL     3,445,689

LINEAR MOTION DEVICE

Filed Jan. 5, 1965

WITNESSES:
John L. Chopp
James F. Young

INVENTOR
Thomas F. Widmer and
Donald G. Sherwood
BY
ATTORNEY

United States Patent Office 3,445,689
Patented May 20, 1969

1

3,445,689
LINEAR MOTION DEVICE
Donald G. Sherwood, Pittsburgh, and Thomas F. Widmer, King of Prussia, Pa., assignors to Westinghouse Electric Corporation, Pittsburgh, Pa., a corporation of Pennsylvania
Filed Jan. 5, 1965, Ser. No. 423,544
Int. Cl. H02h 41/02
U.S. Cl. 310—14        8 Claims This invention relates to a linear motion device, and more particularly to improved friction gripping means for a linear motion device.

There are many applications wherein it is desired to actuate a control element in a linear direction to a desired or predetermined position for the purpose of controlling various chemical processes or reactions, or for the purpose of actuating various elements of a complex mechanism. In many cases the control element must be located entirely within a sealed, pressurized system. For example, in the production of nuclear energy in an atomic reactor, a number of control rods are moved within the reactor vessel by linear motion devices in order to control the chain reaction developed in the core of the atomic reactor.

In the past, linear motion devices have been proposed in which a plurality of electromagnetic coils are mounted in a manner to secure by magnetic attraction a linear element passing through the coils. Some of the coils are utilized in combination with mechanical gripping devices to secure the element to a fixed member, while other coils are employed to secure the linear element to a movable member. The movable member, in turn, is moved in either direction of a straight-line path of travel by a pair of additional or displacing coils.

In previous linear motion devices of the type described above, the mechanism load capacity was usually limited by the gripping device used to hold and release the linear element during indexing or cycling. Two general types of grippers have been used heretofore on linear motion devices. The first of these utilizes a grooved rod or linear element with magnetically actuated latches having teeth which positively grip the rod while it advances through each indexing step. Systems of this type offer excellent load capacity but some of such systems are undesirable from a wear and "scram" reliability standpoint, "scram" being that condition in an atomic reactor installation where the control rods must be moved rapidly through a relatively long stroke. Mechanisms utilizing this sort of gripper have been characterized by erratic operation with frequent jamming. This, of course, is due to the difficulty in rapidly engaging and disengaging latch teeth subjected to a high friction coefficient as in hot pressurized water systems.

The second type of gripper relies on magnetic expansion of a flexible rod bundle against the bore of a movable plunger. The normal force exerted by magnetic attraction produces friction which acts along the control rod axis to provide a load capacity. Scram and cycling reliability are greatly improved with this type of gripper since no self-locking can occur regardless of high friction coefficients. However, dependence on only a friction grip at the magnetic gap severely limits the capability of this design when large rod weights or shock loads are imposed. Furthermore, the mechanism must be designed with a large number of coils producing force at many gaps in order to develop adequate working capacity.

As an overall object, the present invention seeks to provide a new and improved friction grip linear motion device having increased load capacity over previous mechanisms of this type.

2

More specifically, an object of the invention is to provide a gripper mechanism for a linear motion device which incorporates the desirable features of both types of prior art gripper mechanisms described above, while eliminating their respective disadvantages.

In accordance with the invention, an improved friction gripper is provided comprising at least one gripper arm extending generally parallel to the linear element to be controlled, means pivotally mounting the gripper arm about an axis spaced from the linear element to provide a short lever arm on one side of the pivotal mounting means and a long lever arm on the other side, and electromagnetic coil means for forcing the long lever arm radially outwardly whereby the short lever arm will be forced radially inwardly to frictionally engage the linear element with a large mechanical advantage.

As will be seen, the gripping force results with this arrangement from a multiplication of the magnetic force produced by the coil means through a large mechanical advantage afforded by the aforesaid lever arrangement of the gripper arm. At the same time, the total motion of the gripping arm from released to gripping positions is extremely small since the gripping surface on the short lever arm is smooth and has no latch teeth which must move into notches or grooves of finite depth. For this reason, the magnet air gap will be very small even when the mechanical advantage is large. This facilitates high magnetic forces with good efficiency, further adding to the potential capacity of the mechanism.

The above and other objects and features of the invention will become apparent from the following detailed description taken in connection with the accompanying drawings which form a part of this specification, and in which.

Figure 1:
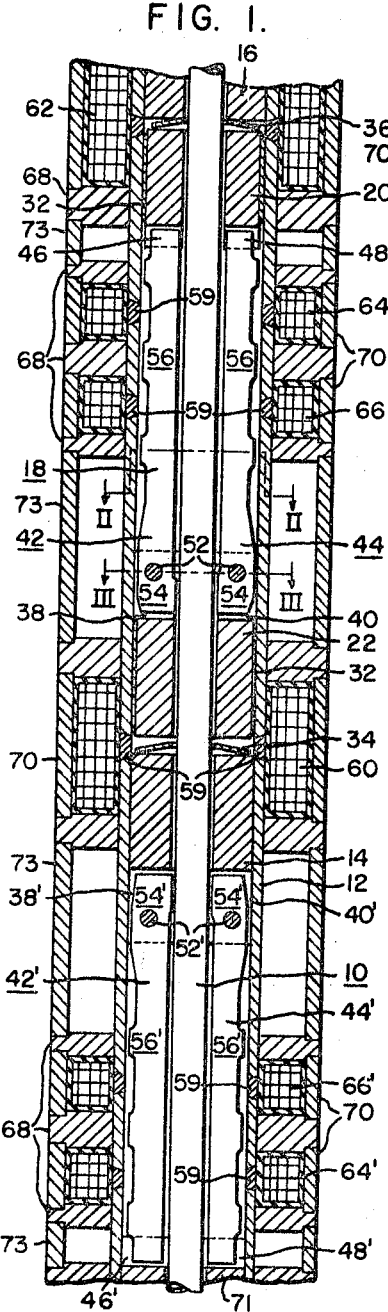
FIGURE 1 is a longitudinal cross-sectional view of a linear motion device employing the improved gripping devices of the invention.
Figure 2:
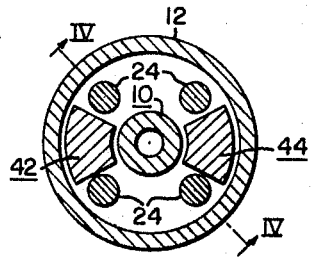
FIG. 2 is a cross-sectional view taken along line II—II of FIG. 1.
Figure 3:
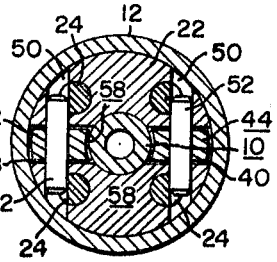
FIG. 3 is a cross-sectional view taken along line III—III of FIG. 1.
Figure 4:
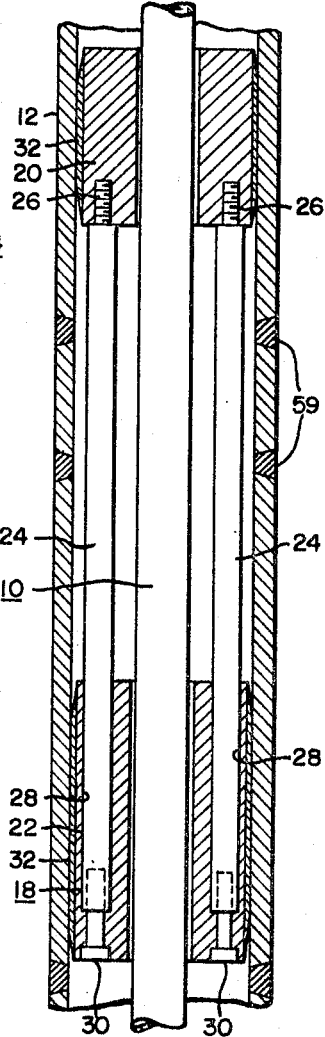
FIG. 4 is a cross-sectional view taken substantially along line IV—IV of FIG. 2, but eliminating, for purposes of simplicity, the external magnetic coils.

Referring now to the drawings, and particularly to FIG. 1, the linear motion device shown comprises a linear element in the form of a hollow rod 10 adapted for straight-line movement along its axis within an outer generally tubular housing 12. Within the housing 12 and secured to its inner periphery are tubular retaining members 14 and 16. These members are stationary and serve to limit the stroke in either direction of a linear actuating assembly, generally indicated by the reference numeral 18. The linear actuating assembly 18 includes a pair of spaced cylindrical members 20 and 22 of magnetic material which, as shown in FIG. 4, are interconnected by means of tie rods 24, there being four such tie rods as best shown in FIGS. 2 and 3. Each tie rod is threaded into a bore 26 in the member 20 and extends into a bore 28 in member 22. Each rod is held within its associated bore 28 by means of a bolt 30 threaded into one end of the rod 24.

On the periphery of the cylindrical members 20 and 22, as best shown in FIG. 4, are layers 32 of a hard facing alloy, i.e. a cobalt base alloy sold commercially under the tradename "Stellite" or the like which facilitate sliding movement of the actuating assembly 18 between the retaining members 16 and 14. Between retaining member 14 and cylindrical member 22 is an annular cushion spring 34. Similarly, an annular cushion spring 36 is interposed in the space between the members 16 and 20.

As will be seen, these springs serve to cushion the impact of the linear actuating assembly 18 as it is forced against retaining member 14 or 16, as the case may be.

Formed in the cylindrical member 22, as best shown in FIG. 3, are a pair of slots 38 and 40 spaced 180° apart. Each slot 38 or 40 receives one end of a gripper arm 42 or 44, respectively, of a magnetic material. The other ends of the gripper arms 42 and 44 are received within slots 46 and 48, respectively, which are spaced 180° apart in the member 20. Provided in the member 22 are bores 50 which receive pivot pins 52, the pins being radially spaced from element 10 and perpendicular to a plane passing through its axis. The pins 52 pass through the respective gripper arms 42 and 44 to provide a first relatively short lever arm portion 54 below each pin 52 as viewed in FIG. 1 and a relatively long lever arm portion 56 above each pin 52.

As best shown in FIG. 3, the radial inward surface of each lever arm portion 54 has an arcuate surface 58 formed thereon and adapted to frictionally engage the linear element 10. With the arrangement described, it will be appreciated that by applying radial outward forces to the long lever arm portions 56, the lever arm portions 54 will be forced radially inwardly with their surfaces 58 frictionally engaging the linear element 10. Furthermore it will be appreciated that in applying a radial outward force to the upper ends of the lever arm portions 56, a very large mechanical advantage can be obtained with the force applied through surfaces 58 being greatly multiplied.

The outer housing 12 is formed in sections of magnetically permeable material such as plain carbon steel. Between the sections of the housing 12 are annular spacers 59 of a non-magnetically permeable material such as nonmag stainless steel. Surrounding the spacers 59 are magnetic coil assemblies, the first of such assemblies 60 being a pull-down coil which is adapted to be energized so as to produce lines of flux which attract the member 22 toward member 14. In this process, it will be appreciated that the entire actuating assembly 18 is pulled toward the member 14 and into engagement with the cushion spring 34. At the other end of the assembly is a lifting coil 62 adapted to be energized so as to produce lines of flux which attract the member 20 toward member 16. Surrounding the lever arms 56 are a pair of gripping coils 64 and 66 which, when energized, produce lines of flux to move the lever arms 56 radially outwardly, with the outermost ends of the arms sliding in the slots 46 and 48. In this process, it will be appreciated that high gripping forces are applied through the arcuate surfaces 58 to the linear element 10, thereby securing it to the assembly 18 as it is moved upwardly or downwardly through an increment determined by the spacing between the ends of members 20 and 22, and the members 16 and 14.

Below the pull-down coil 60 are a second set of gripper arms 42' and 44' pivotally carried in slots 38' and 40' of stationary tubular member 14. The other ends of the gripper arms 42' and 44' slide within slots 46' and 48' of a lower stationary cylindrical stop 71.

Since the construction and operation of gripper arms 42' and 44' is the same as that of gripper arms 42 and 44, their parts are identified by corresponding, primed reference numerals. However, it is important to note that whereas the arms 42 and 44 are carried on the linearly movable actuating assembly 18, the arms 42' and 44' cannot move linearly. The coil magnetic assemblies are completed by annular magnetic spacers 68 on either side of each coil, separated by relatively short cylindrical magnetic sections 70 which form an outer casing for the device. Both the spacers 68 and sections 70 act to provide a low reluctance path for the lines of flux produced by the respective coils. Non-magnetic spacing sleeves 73 extend between adjacent coil structures to complete the mounting arrangement of the solenoid coils.

In operation, the linear element 10 will be held in a selected stationary position by energizing gripping coils 64' and 66' to move short lever arm portions 54' into engagement with element 10. To move the element 10 upwardly, coils 64 and 66 are maintained deenergized while coil 60 is energized to pull the actuating assembly 18 downwardly within housing 12. During this time, coils 64' and 66' are energized to hold element 10 in position. Thereafter, coils 64 and 66 are energized whereby surfaces 58 on arms 42 and 44 grip element 10; coils 64' and 66' are deenergized; coil 60 is deenergized; and coil 62 is energized to pull assembly 18 upwardly, which assembly carries with it the element 10. In this process, it will be appreciated that the element 10 is moved upwardly through an increment determined by the spacing which existed between the upper end of member 20 and member 16 at the beginning of the stroke. Following this coils 64' and 66' are again energized to hold element 10 in place, coils 62, 64 and 66 are then deenergized and coil 60 is energized to move the assembly 18 downwardly relative to element 10 into engagement with stop 14 and the above described cycle is repeated.

To move the element 10 downwardly, the foregoing cycle is reversed. More particularly, coils 64' and 66' are energized to hold element 10 and coils 64, 66 and 62 are deenergized. Coil 62 is then energized moving assembly 18 upwardly. Coils 64 and 66 are energized and coils 64' and 66' are then deenergized causing grippers 42 to engage element 10. Element 10 and assembly 18 can then move downwardly as a unit under the influence of gravity and if more accelerated movement is desired, coil 60 may be energized to increase the speed of such downward movement. Additional downward incremental movement is achieved by reenergizing coils 64' and 66' to have grippers 42' hold element 10. Coils 64 and 66 are deenergized and then coil 60 is deenergized and coil 62 is energized to move assembly 18 upwardly relative to element 10 into engagement with stop 16. The above described downward cycle is then repeated.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A friction gripping device for a linear motion device having a movable linear element, which comprises at least one rigid gripper arm positioned outwardly of and extending generally parallel to said movable linear element, means pivotally mounting the gripper arm about an axis spaced from the linear element to provide a first lever arm portion on one side of the pivotal mounting means and a second lever arm portion on the other side of the pivotal mounting means, the second lever arm portion being many times longer than said first portion, said linear element having a relatively smooth outer peripheral surface thereon, and means for forcing the longer second lever arm portion radially outwardly whereby the shorter first lever arm portion will be forced radially inwardly toward the linear element to frictionally engage the adjacent portion of said smooth peripheral surface of the same.

2. In a linear motion device of the type having a movable linear element and means for applying a linear moving force to said element; the improvement in means for frictionally engaging said linear element comprising at least one elongated rigid gripper arm extending generally parallel to said linear element on one side thereof, means pivotally mounting said gripper arm about a pivot axis radially spaced from the axis of the linear element and extending perpendicular to a plane which intersects said axis of the linear element, said linear element having a relatively smooth outer peripheral surface thereon, the gripper arm having a first lever arm portion extending generally parallel to the linear element and outwardly from one side of the pivotal mounting means and a second lever arm portion extending generally parallel to the linear element and outwardly from the other side of the pivotal mounting means, a surface on said one lever arm portion arranged to frictionally engage an adjacent portion of the peripheral surface of the liner element upon pivotal inward movement of said one portion toward said linear element, and means operatively associated with said other lever arm portion for forcing it radially outwardly.

3. The improvement of claim 2 wherein said means operatively associated with the other lever arm portion for forcing it radially outwardly comprises electromagnetic coil means.

4. In a linear motion device of the type having a movable linear element and means for applying a linear moving force to said element; the improvement in means for frictionally engaging said linear element comprising at least one elongated rigid gripper arm extending generally parallel to said linear element on one side thereof, means pivotally mounting said gripper arm about a pivotal axis radially spaced from the axis of the linear element and perpendicular to a plane extending through said axis of the linear element, the gripper arm having a first lever arm portion extending generally parallel to the linear element and outwardly from one side of the pivotal mounting means and a second lever arm portion extending generally parallel to the linear element and outwardly from the other side of the pivotal mounting means, said linear element having a relatively smooth outer peripheral surface thereon a relatively smooth non-grooved surface on said one lever arm portion arranged to frictionally engage the adjacent portion of said peripheral surface of the linear element upon pivotal inward movement of said one portion toward said linear element, and means operatively associated with said other lever arm portion for forcing it radially outwardly about said pivotal axis.

5. In a linear motion device of the type having a movable linear element and means for applying a linear moving force to said element; the improvement in means for frictionally engaging said linear element comprising a plurality of elongated rigid gripper arms extending generally parallel to said linear element and radially spaced therefrom, means pivotally mounting each of said gripper arms about a pivotal axis which is radially spaced from the axis of the linear element and perpendicular to a plane which extends through said axis of the linear element, the gripper arms each having a first lever arm portion extending generally parallel to the linear element and away from one side of the pivotal mounting means and a second lever arm portion extending generally parallel to the linear element and away from the other side of the pivotal mounting means, a surface on said one lever arm portion of each gripper arm arranged to frictionally engage the linear element upon radial inward movement about said pivotal axis of said one portion toward said linear element, and electromagnetic coil means operatively associated with said other lever arm portion of each gripper arm for forcing it radially outwardly about said pivotal axis.

6. In a linear motion device of the type having a movable linear element and means for applying a linear moving force to said element; the improvement in means for frictionally engaging said linear element comprising at least one elongated rigid gripper arm extending generally parallel to said linear element on one side thereof, means pivotally mounting said gripper arm about a pivotal axis radially spaced from the axis of the linear element and perpendicular to a plane which extends through said axis of the linear element, the gripper arm having a first lever arm portion extending axially away from one side of the pivotal mounting means a second lever arm portion many times the length of said first portion extending axially away from the other side of the pivotal mounting means, a surface on said one portion arranged to frictionally engage the linear element upon radial movement of said one portion toward said linear element about said pivotal axis, and electromagnetic coil means associated with said other portion for forcing it radially outwardly about said pivotal axis.

7. In a linear motion device of the type having a movable linear element within an elongated cylindrical housing and electromagnetic coil means surrounding the cylindrical housing for applying a linear moving force to said linear element; the improvement in means for frictionally engaging said linear element to hold it in a predetermined stationary position comprising a plurality of rigid gripper arms extending generally parallel to said linear element within said cylindrical housing, means pivotally mounting each of said gripper arms about an associated stationary pivotal axis radially spaced from the axis of the linear element and perpendicular to a plane which extends through the axis of the linear element, each gripper arm having a first portion extending axially away from one side of its pivotal mounting means and a second portion extending axially away from the other side of its pivotal mounting means, a surface on said one portion of each gripper arm arranged to frictionally engage the linear element upon radial inward movement of said one portion toward said linear element about said pivotal axis, said second portion being many times greater in length than said first portion, and electromagnetic coil means surrounding said cylindrical housing for selectively forcing said other portion of each gripper arm radially outwardly about said pivotal axis.

8. In a linear motion device, a movable linear element, a linearly movable cylindrical assembly surrounding said linear element, at least portions of said cylindrical assembly being formed from magnetically permeable material, electromagnetic coil means on opposite ends of said cylindrical assembly, one of said coil means being adapted to move said assembly in one direction along a straight-line path under the influence of an electromagnetic field produced thereby and the other of said coils being adapted to move said cylindrical assembly in the other direction along said straight-line path under the influence of an electromagnetic field produced thereby, and rigid gripper arms on said cylindrical assembly arranged to selectively engage said linear element whereby the linear element will move with said cylindrical assembly when the gripper arms on the cylindrical element engage said linear element, and electromagnetic coil means for selectively actuating said gripper arms to grip said linear element, each of said gripper arms being pivotally connected to said cylindrical assembly to provide a first lever arm portion on one side of the pivotal connection adapted to frictionally engage the linear element upon pivotal movement thereof toward said linear element, and a second lever arm portion on the other side of the pivotal connection adapted to be forced pivotally outwardly under the influence of a magnetic field produced by said last-named electromagnetic coil means.

References Cited

UNITED STATES PATENTS

| | | | |
|---|---|---|---|
| 2,803,761 | 8/1957 | Young | 310—14 |
| 3,143,192 | 8/1964 | Buchanan | 188—67 |
| 3,158,766 | 11/1964 | Frisch | 310—14 |

J D MILLER, *Primary Examiner.*

D. F. DUGGAN, *Assistant Examiner.*

U.S. Cl. X.R.

74—111, 128